United States Patent
Walters et al.

(10) Patent No.: US 10,238,035 B2
(45) Date of Patent: Mar. 26, 2019

(54) MULTI-PART SPROCKET ASSEMBLY AND SHAFT

(71) Applicant: iwis drive systems, LLC, Indianapolis, IN (US)

(72) Inventors: Glenn A. Walters, Carmel, IN (US); Daniel P. Egenolf, Indianapolis, IN (US)

(73) Assignee: IWIS DRIVE SYSTEMS, LLC, Indianapolis, IN (US)

( * ) Notice: Subject to any disclaimer, the term of this patent is extended or adjusted under 35 U.S.C. 154(b) by 79 days.

(21) Appl. No.: 15/444,389

(22) Filed: Feb. 28, 2017

(65) Prior Publication Data

US 2017/0251603 A1 Sep. 7, 2017

Related U.S. Application Data

(60) Provisional application No. 62/303,330, filed on Mar. 3, 2016.

(51) Int. Cl.
*A01D 69/06* (2006.01)
*F16H 55/30* (2006.01)
(Continued)

(52) U.S. Cl.
CPC .............. *A01D 69/06* (2013.01); *A01D 61/00* (2013.01); *F16H 7/06* (2013.01); *F16H 55/30* (2013.01);
(Continued)

(58) Field of Classification Search
CPC ...... A01D 69/06; A01D 61/00; A01D 61/008; F16H 7/06; F16H 55/30; F16H 55/46;
(Continued)

(56) References Cited

U.S. PATENT DOCUMENTS 302,218 A * 7/1884 Zitzewitz ................ F16H 55/30
474/95
1,244,835 A * 10/1917 Cobert .................... F16H 55/46
474/98

(Continued)

FOREIGN PATENT DOCUMENTS

GB 153239 A * 11/1920 ............. F16H 55/46

*Primary Examiner* — Alicia Torres
*Assistant Examiner* — Adam J Behrens
(74) *Attorney, Agent, or Firm* — Bose McKinney & Evans LLP

(57) ABSTRACT

A shaft and sprocket assembly having an elongate shaft, a sprocket wheel and at least one bracket member. The sprocket wheel encircles and engages the shaft wherein torque is transferrable between the shaft and the sprocket wheel. The sprocket wheel includes radially outwardly extending teeth and is formed by a plurality of sprocket members. Each of the sprocket members defines an angular portion of the sprocket wheel less than 360 degrees. The bracket member detachably secures the individual plurality of sprocket members together thereby allowing the sprocket members to be easily removed from and installed on the shaft. The bracket member is positioned such that no torque is directly transferred from the shaft to the bracket member. The shaft and sprocket assembly can be used in a variety of applications including in the feederhouse of an agricultural combine.

11 Claims, 8 Drawing Sheets

(51) Int. Cl.
*F16H 7/06* (2006.01)
*F16H 57/00* (2012.01)
*F16H 57/021* (2012.01)
*F16H 57/035* (2012.01)
*A01D 61/00* (2006.01)
*F16H 57/02* (2012.01)

(52) U.S. Cl.
CPC ....... *F16H 57/0025* (2013.01); *F16H 57/021* (2013.01); *F16H 57/035* (2013.01); *F16H 2057/02069* (2013.01)

(58) Field of Classification Search
CPC .. F16H 57/0025; F16H 57/021; F16H 57/035; F16H 2057/02069; B65G 23/06
USPC ........... 474/162; 198/834; 74/439, 445, 446, 74/447, 448, 450, 451
See application file for complete search history.

(56) References Cited

U.S. PATENT DOCUMENTS

| | | | | |
|---|---|---|---|---|
| 1,382,829 | A * | 6/1921 | Gilbert | F16H 55/46 403/344 |
| 1,391,719 | A * | 9/1921 | Conyngham | F16H 55/12 474/95 |
| 2,230,902 | A * | 2/1941 | Overbey | F16H 55/12 74/448 |
| 2,361,131 | A * | 10/1944 | Smith | A01D 17/10 198/834 |
| 2,465,570 | A * | 3/1949 | Bocchino | F16H 55/30 474/162 |
| 3,083,585 | A * | 4/1963 | Dawe | B62D 55/135 29/402.08 |
| 3,159,047 | A * | 12/1964 | Dable | F16H 55/12 403/344 |
| 3,319,413 | A * | 5/1967 | Costner | D01H 1/242 57/102 |
| 3,501,972 | A | 3/1970 | Morrow et al. | |
| 3,685,367 | A | 8/1972 | Dawson | |
| 3,724,285 | A * | 4/1973 | Lapeyre | F16H 55/30 198/834 |
| 4,031,769 | A * | 6/1977 | Kassing | F16H 55/12 474/162 |
| 4,043,214 | A * | 8/1977 | Westlake | F16H 55/12 474/162 |
| 4,049,112 | A * | 9/1977 | Tyslauk | B65G 23/06 198/834 |
| RE30,341 | E * | 7/1980 | Lapeyre | B65G 23/06 198/834 |
| 4,506,559 | A * | 3/1985 | Francke | F16H 55/12 29/892.1 |
| 4,858,751 | A * | 8/1989 | Hodlewsky | B65G 17/08 198/325 |
| 5,035,681 | A * | 7/1991 | Hertel | F16C 33/201 210/251 |
| 5,037,356 | A * | 8/1991 | Gladczak | F16H 55/12 474/902 |
| 5,131,890 | A * | 7/1992 | Hertel | F16C 33/201 474/152 |
| 5,279,526 | A | 1/1994 | Gundlach | |
| 5,295,917 | A * | 3/1994 | Hannum | F16H 55/12 474/95 |
| 5,316,522 | A | 5/1994 | Carbone et al. | |
| 5,322,478 | A * | 6/1994 | Bos | B65G 23/06 474/95 |
| 5,389,044 | A * | 2/1995 | Bandy, Jr. | B65G 23/06 474/152 |
| 5,469,958 | A * | 11/1995 | Gruettner | B65G 23/06 198/834 |
| 5,518,109 | A * | 5/1996 | Dailey | B65G 23/06 198/834 |
| 5,702,316 | A * | 12/1997 | Cole | F16H 55/12 474/95 |
| 5,833,562 | A * | 11/1998 | Walker, Sr. | F16H 55/30 474/96 |
| 6,074,316 | A * | 6/2000 | Murrietta, Sr. | F16H 55/12 474/95 |
| 6,086,495 | A * | 7/2000 | Stebnicki | F16H 55/12 474/152 |
| 6,146,299 | A * | 11/2000 | Harvey | F16H 55/12 474/95 |
| 6,312,329 | B1 | 11/2001 | Digman et al. | |
| 6,543,609 | B2 | 4/2003 | Layne et al. | |
| 6,758,776 | B2 * | 7/2004 | Fye | F16H 55/30 198/834 |
| 7,556,143 | B2 | 7/2009 | Crooks | |
| 8,267,818 | B2 * | 9/2012 | Curley | F16H 55/12 474/152 |
| 8,826,635 | B2 | 9/2014 | Schraeder | |
| 9,097,332 | B2 * | 8/2015 | Li | F16H 55/12 |
| 9,388,894 | B2 * | 7/2016 | Van Der Ende | F16H 55/12 |
| 2007/0161443 | A1 | 7/2007 | Krisl | |
| 2010/0160097 | A1 | 6/2010 | Van Der Ende | |
| 2014/0305241 | A1 | 10/2014 | Li et al. | |
| 2015/0060242 | A1 * | 3/2015 | Carrara | B65G 39/02 198/834 |
| 2016/0040773 | A1 * | 2/2016 | Sturgin | F16H 57/0025 74/434 |

\* cited by examiner

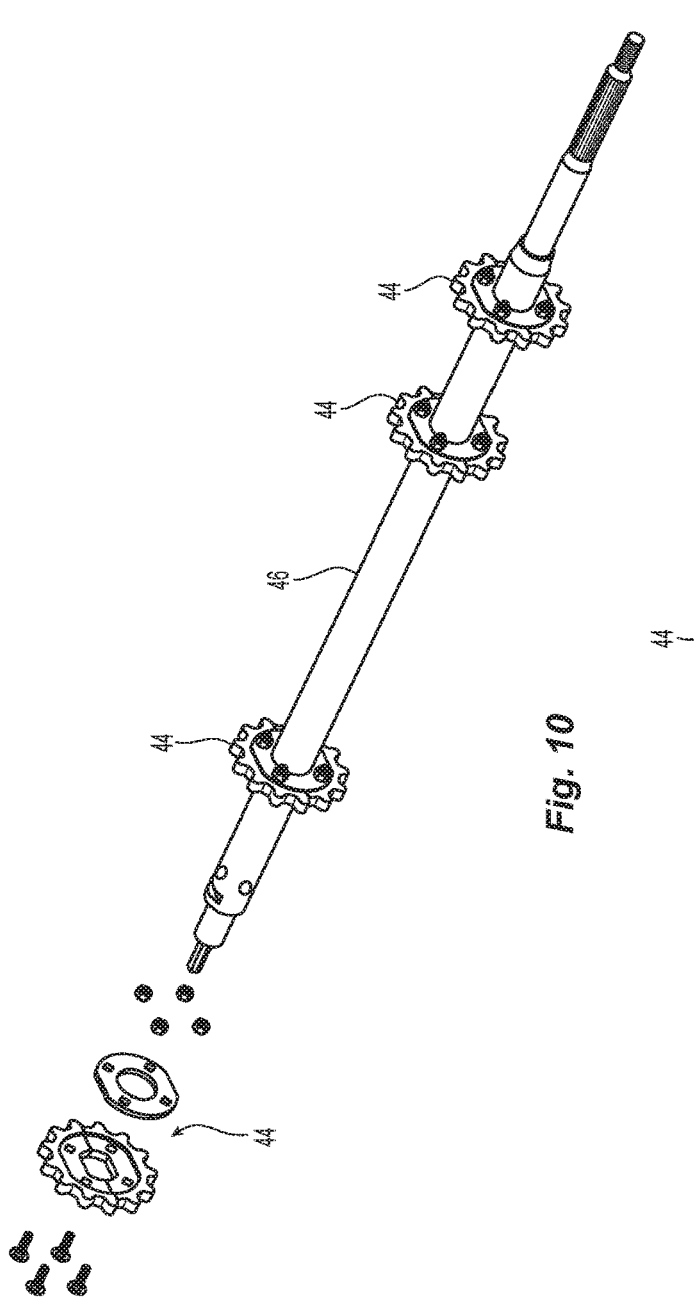
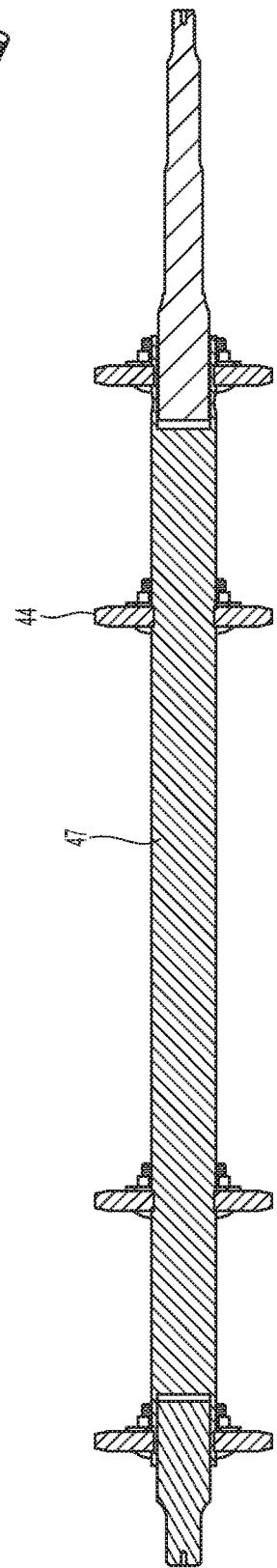
Fig. 10
Fig. 11

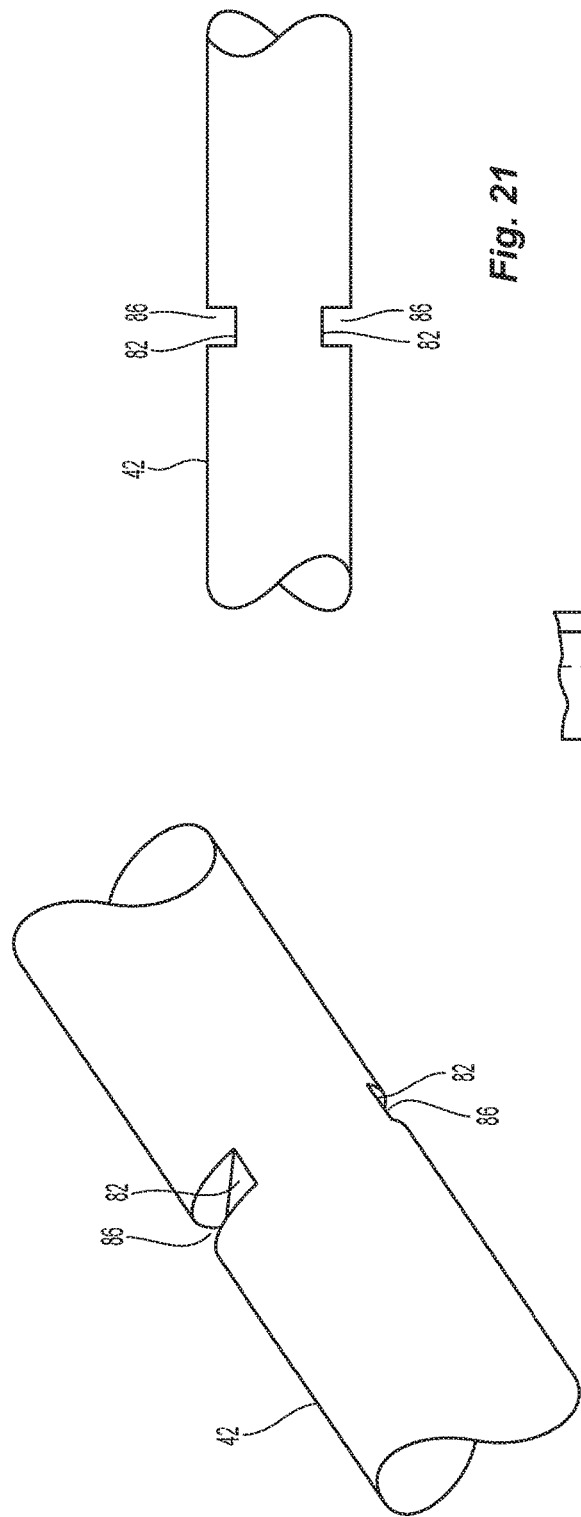

MULTI-PART SPROCKET ASSEMBLY AND SHAFT

CROSS REFERENCE TO RELATED APPLICATIONS

This application claims priority under 35 U.S.C. 119(e) of U.S. provisional patent application Ser. No. 62/303,330 filed on Mar. 3, 2016 entitled MULTI-PART SPROCKET ASSEMBLY AND SHAFT the disclosure of which is hereby incorporated herein by reference.

BACKGROUND

1. Technical Field

The present invention relates to a multi-part sprocket assembly.

2. Description of the Related Art

Agricultural combines typically have removable heads wherein each of the heads is designed for use with a particular crop. A conventional combine head includes a reel and a reciprocating knife cutter bar to cut the crop. An auger then moves the cut crop toward the center of the header. A feederhouse supports the header and receives the cut crop in a conventional combine. The feederhouse then lifts the cut crop and moves it rearward into a threshing mechanism in the body of the combine. A conventional feederhouse includes a chain and lift elevator that carries the crop to the threshing mechanism. The threshing mechanism separates the grain from the chaff and typically utilizes a rotating drum in the threshing process.

Feederhouses conventionally include a shaft having multiple sprockets wherein the sprockets are engaged with the chains of the feederhouse to drive the lift elevator and chains of the feederhouse. The sprockets are subject to wear and periodically fail. Failure of one of the sprockets will generally prevent the combine from operating properly and appropriate repairs must be made before the combine can be returned to service. Repair of a conventional shaft and sprocket assembly is very time consuming and oftentimes takes the combine out of production during the brief time window available for harvesting a crop.

Conventional shaft and sprocket assemblies generally have one of two designs. In one design, the sprockets are welded to the shaft. For this type of shaft and sprocket assembly, the entire shaft and sprocket assembly must be replaced. This requires significant disassembly and reassembly of the feederhouse. It also necessitates replacing the entire shaft and sprocket assembly when only one sprocket is damaged. FIGS. 1-3 illustrate an example of this type of design. The design includes a cylindrical sleeve 20 forming a hub from which a geared plate 22 projects to form the sprocket. The cylindrical sleeve 20 is slid onto a cylindrical shaft 24 and welded to the shaft 24 at the desired location. The example depicted in FIG. 3 has three sprockets mounted on a shaft.

Another type of shaft and sprocket assembly commonly used in feederhouse designs is the use sprockets having a non-circular central opening that is slid onto a non-circular shaft. The use of a non-circular shaft and sprocket opening forms a key and keyway type arrangement and allows for the transfer of torque from the shaft to the sprocket. FIG. 4 presents a view of a sprocket 26 having a sleeve defining a non-circular opening 28 that mates with a non-circular shaft 30 (FIG. 5). Significantly more machining is required to form a non-circular shaft 30 in comparison to a circular shaft of the same length.

When a sprocket similar to that depicted in FIG. 4 fails, it is only necessary to replace the damaged sprocket while the undamaged sprockets and the shaft (if undamaged) can be reused. The shaft and sprocket assembly, however, must still be entirely removed from the feederhouse for the damaged sprocket to be removed and for the new sprocket to be installed. This is because the sprockets must be slid off one end of the shaft to be removed and slid onto the shaft from one end and longitudinally along the shaft to the desired location on the shaft during installation.

Feederhouse shafts having sprockets mounted thereon typically have one end that is rotatably supported on a pillow block bearing and an opposite end that is engaged with a gear box that rotatably drives the shaft. Removing the shaft typically involves removing the pillow block bearing and disengaging the shaft from the gear box. This process takes a significant amount of time and generally requires skilled labor oftentimes requiring that the machinery be brought to a dealership to remove and reinstall a shaft instead of performing this maintenance operation in the field.

Thus, both of the most common prior art sprocket and shaft arrangements for combine feederhouses require the removal of the shaft and, consequently, remove the combine from production for a significant amount of time to effect the necessary repairs.

Improvements which reduce the downtime associated with the repair of a damaged sprocket are desirable.

SUMMARY

The present invention provides multi-part sprocket assembly that facilitates the rapid removal and replacement of a damaged sprocket.

The invention comprises, in one form thereof, a shaft and sprocket assembly that includes an elongate shaft, a sprocket wheel and at least one bracket member. The sprocket wheel encircles the shaft and is engaged with the shaft wherein torque is directly transferrable between the shaft and the sprocket wheel. The sprocket wheel including a plurality of radially outwardly extending teeth and is formed by a plurality of sprocket members. Each of the sprocket members define an angular portion of the sprocket wheel less than 360 degrees. The at least one bracket member detachably secures the plurality of sprocket members together wherein detachment of the at least one bracket member from the plurality of sprocket members detaches the plurality of sprocket members from the shaft thereby allowing removal of the plurality of sprocket members without having to longitudinally slide the sprocket members off of an end of the shaft. Securement of the at least one bracket member to the plurality of sprocket members allows direct attachment of the plurality of sprocket members at a selected axial location on the shaft thereby allowing the sprocket members to be attached without having to longitudinally slide the sprocket members onto the shaft from an end of the shaft. When the at least one bracket is secured to the plurality of sprocket members, the at least one bracket member is in a non-bearing arrangement with the shaft whereby torque is not directly transferred from the shaft to the at least one bracket member.

In some embodiments, the at least one bracket is detachably secured to the sprocket members with threaded fasteners.

The sprocket wheel may take the form of a flat plate that defines a plurality of radially outwardly extending teeth with the shaft defining a recess for receiving the sprocket wheel. In such an embodiment, the shaft may define a circular cross section with the recess being formed by a non-circular surface, the recess having a longitudinal width adapted to receive the sprocket wheel and restrict longitudinal movement of the sprocket wheel thereby defining a longitudinal location on the shaft at which the sprocket wheel is secured. The non-circular surface forming the recess may include a plurality of flats wherein each of the plurality of sprocket members are engaged by one of the plurality of flats and the engagement of the plurality of flats with the plurality of sprocket members is a bearing engagement that directly transfers torque between the shaft and the plurality of sprocket members.

In some embodiments, the at least one bracket consists solely of one bracket member that encircles the shaft. In such an embodiment, the sprocket wheel may define a cavity for receiving at least a portion of the bracket member wherein each of the sprocket members defines a portion of the cavity and the bracket member defines at least one non-circular feature, the non-circular feature on the bracket member mating with a corresponding non-circular surface in the portion of the cavity defined by each of the sprocket members whereby mating of non-circular feature on the bracket member with the corresponding non-circular surfaces controls the orientation of the plurality of sprocket members relative to the bracket member. In some embodiments, the non-circular feature of the bracket member is defined by at least one flat and engagement of the at least one flat on the bracket member with the corresponding non-circular surfaces in the cavity allow for the transfer of force between the bracket member and the plurality of sprocket members when torque is being transferred from the shaft to the sprocket wheel. In such an embodiment, the sprocket wheel and the bracket member may both be formed by flat plates with the bracket member being detachably secured to the plurality of sprocket members with threaded fasteners.

In embodiments wherein the bracket member has at least one flat, the flat may be disposed on the radially outer edge of the bracket member. In such an embodiment, the bracket member further defining a circular opening through which the shaft extends with the plurality of sprocket members consisting of exactly two sprocket members. The opening in the bracket member may be dimensioned such that the bracket member is spaced from and does not directly engage the shaft.

While in some embodiments, the plurality of sprocket members is exactly two sprocket members, alternative embodiments may use a larger number of sprocket members to form the sprocket wheel.

In still other embodiments, the invention takes the form of a feederhouse assembly for use with an agricultural combine that utilizes a shaft and sprocket assembly such as those described above.

When employed in a feederhouse assembly, the shaft may include a plurality of the sprocket wheels mounted thereon with each of the sprocket wheels being engaged with a chain for driving a lift elevator. The shaft may define first and second opposite ends wherein the first end is operably engaged with a gear box whereby the gear box rotatably drives the shaft and the second end of the shaft is rotatably supported on a bearing assembly. In such an embodiment, each of the sprocket members of each of the sprocket wheels can be removed and replaced without disengaging the first end of the shaft from the gear box or the second end of the shaft from the bearing assembly.

The individual features of the shaft and sprocket assembly described above and disclosed herein may also be combined in various other combinations and such combinations may be utilized in various types of equipment including feederhouse assemblies for agricultural combines.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 10 is a partially exploded perspective view of the shaft of FIG. 6.
FIG. 11 is a cross sectional view of an alternative shaft.
FIG. 20 is a partial schematic view of a shaft.
FIG. 21 is a partial schematic side view of a shaft.
FIG. 22 is a partial schematic view of a shaft and a sprocket assembly.

Figure 1:
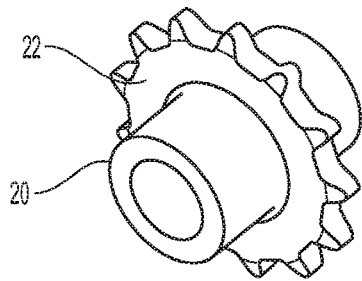
FIG. 1 is a perspective view of a first prior art sprocket.
Figure 2:
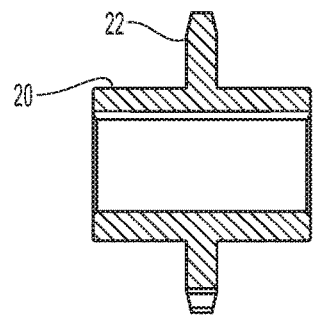
FIG. 2 is a cross sectional view of the first prior art sprocket.
Figure 3:
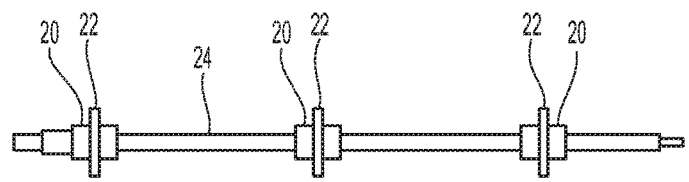
FIG. 3 is a view of a shaft with three of the first prior art sprockets mounted thereon.
Figure 4:
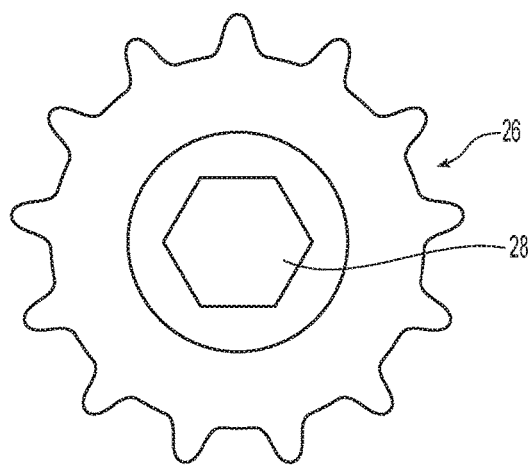
FIG. 4 is an end view of a second prior art sprocket.
Figure 5:
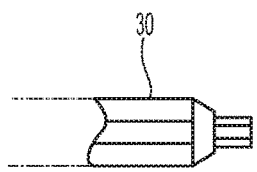
FIG. 5 is a partial side view of a prior art shaft for use with the second prior art sprocket.
Figure 6:
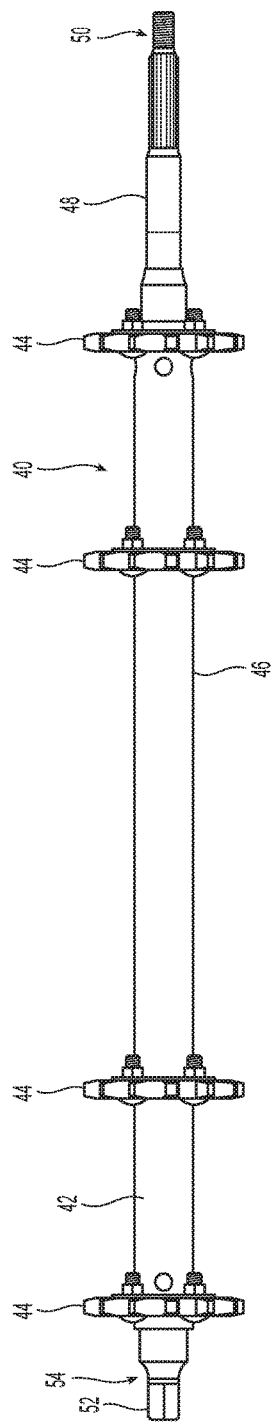
FIG. 6 is a side view of a shaft with four sprocket wheels mounted thereon.
Figure 7:
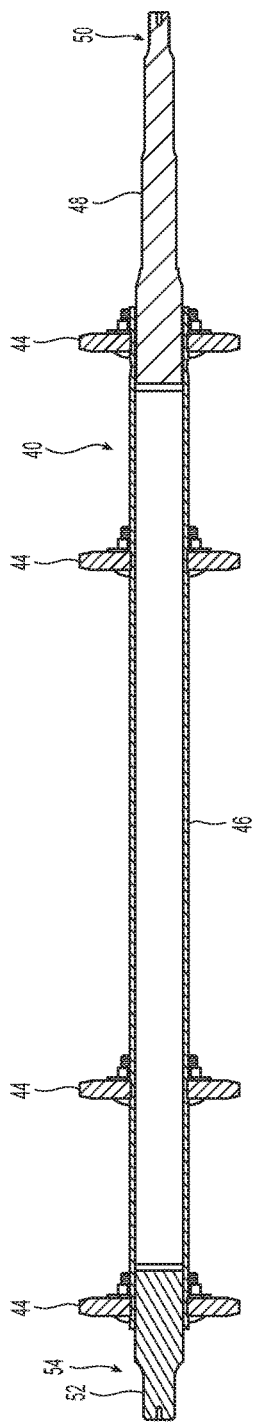
FIG. 7 is a cross sectional view of the shaft of FIG. 6.
Figure 9:
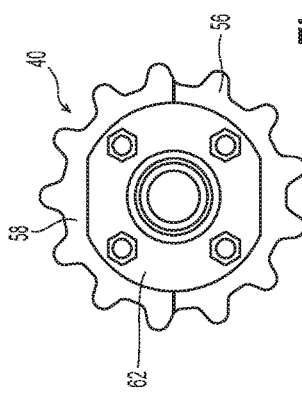
FIG. 9 is another end view of the shaft of FIG. 6.
Figure 8:
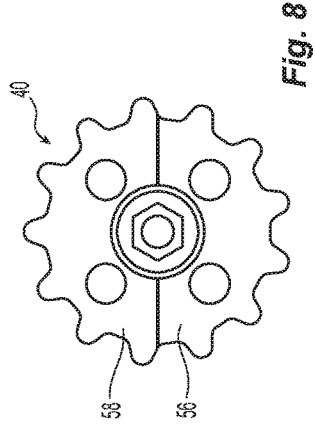
FIG. 8 is an end view of the shaft of FIG. 6.
Figure 13:
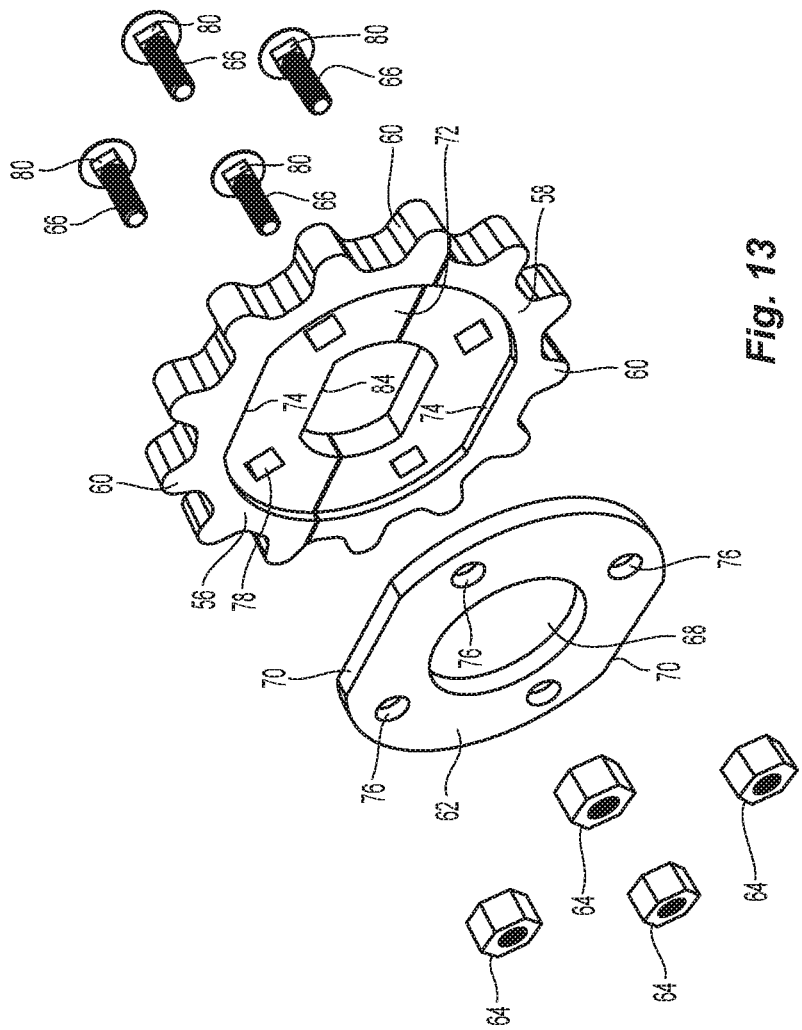
FIG. 13 is an exploded perspective view of a sprocket assembly.
Figure 12:
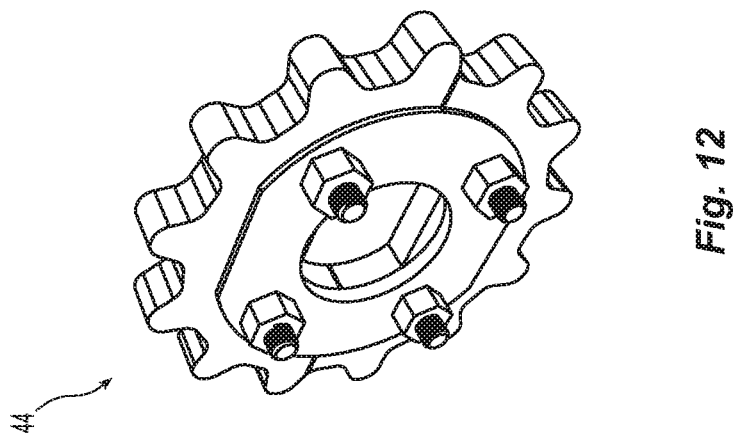
FIG. 12 is a perspective view of sprocket assembly.
Figure 16:
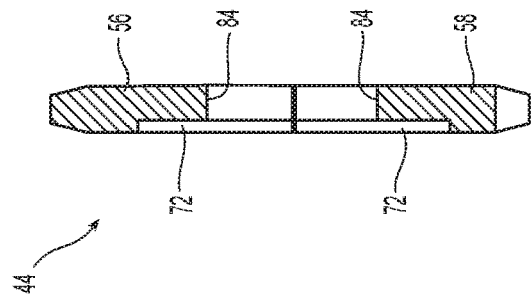
FIG. 16 is a cross sectional view of the sprocket wheel of FIG. 14.
Figure 15:
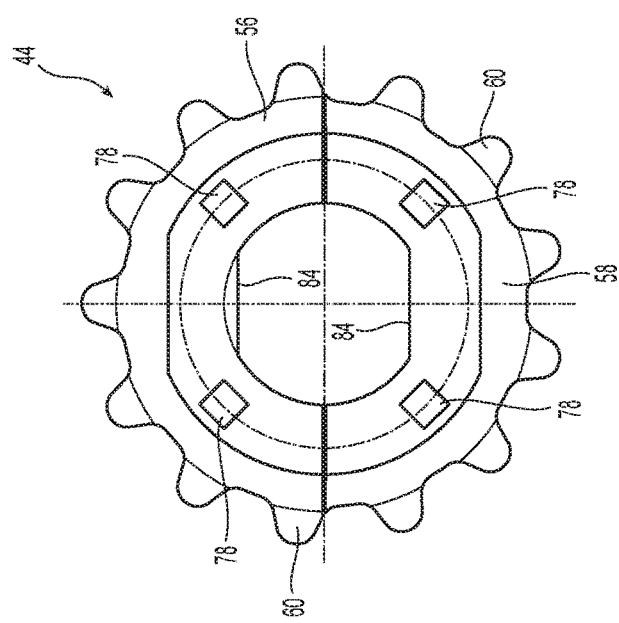
FIG. 15 is a front view of the sprocket wheel of FIG. 14.
Figure 14:
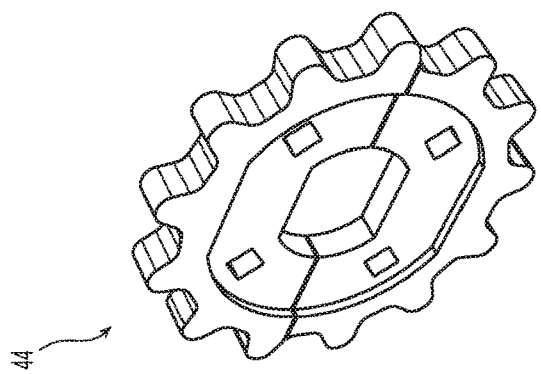
FIG. 14 is a perspective view of a sprocket wheel formed out of two sprocket members.
Figure 19:
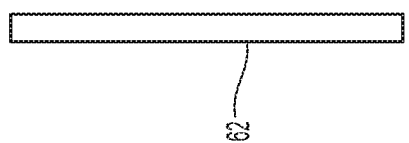
FIG. 19 is side view of the bracket of FIG. 17.
Figure 18:
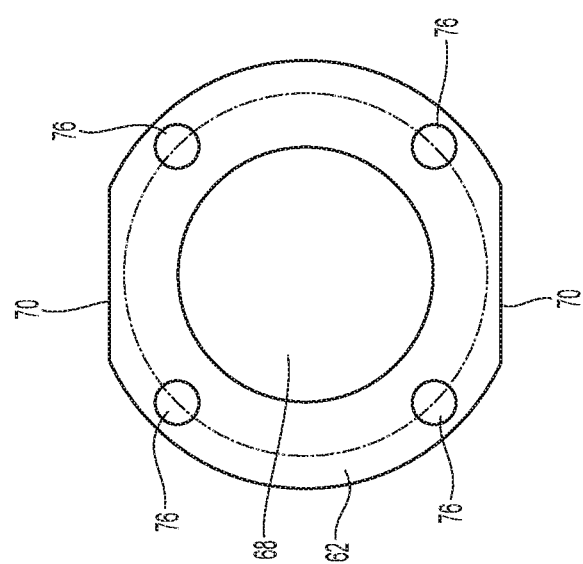
FIG. 18 is a front view of the bracket of FIG. 17.
Figure 17:
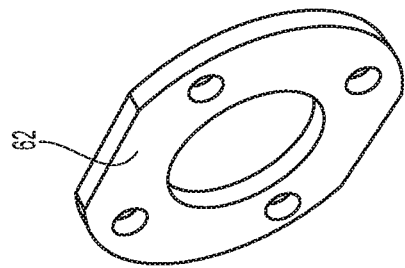
FIG. 17 is a perspective view of a bracket for use with the sprocket assembly of FIG. 12.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

A shaft and sprocket assembly 40 is shown in FIGS. 7-10. The illustrated assembly 40 includes an elongate shaft 42 and four sprocket wheels 44. Alternative arrangements, however, may have either fewer or more sprocket wheels 44. The shaft 42 illustrated in FIGS. 7-10 has a main tube 46 which is a hollow cylindrical metal tube. A first splined insert 48 defines a first end 50 of shaft 40 while a second splined inset 52 defines a second end 52 of shaft 40. The first splined insert 48 is adapted to be engaged with a gear box while the second splined insert 52 is adapted to be engaged with a bearing assembly as further discussed below. The splined inserts 48, 52 are welded or otherwise suitably secured to main tube 46. The shaft and sprocket assembly depicted in FIG. 11 is similar to that of FIGS. 7-10 except that main shaft tube 47 is a solid cylindrical metal shaft instead of a hollow tube.

Each of the sprocket wheels 44 encircles the shaft 42 and is engaged with shaft 42 in a manner that allows torque to be transferred between the shaft and the sprocket wheel. The sprocket wheel 44 also includes a feature that allows it to transfer torque with another part. In the illustrated embodiment, the sprocket wheels 44 include a plurality of radially outwardly extending teeth 60 whereby the sprocket wheel may engage and transfer torque with a chain.

Each of the sprocket wheels 44 is formed by a plurality of sprocket members 56, 58. Each of the sprocket members 56, 58 defines an angular portion of the sprocket wheel less than 360 degrees. In other words, none of the individual sprocket members 56, 58 fully encircle shaft 42. As further discussed below, this allows the sprocket members 56, 58 to be attached and removed from the shaft without having to slide the sprocket wheel 44 along the longitudinal length of the shaft. Generally, it will require that none of the sprocket members encircle more than 180 degrees of the shaft for the sprocket members to be removable without sliding them off the end of the shaft, however, if the shaft is provided with a suitable cross section size and shape it may also be possible for a sprocket member to extend for more than 180 angular degrees about the shaft and still be removable from the shaft without sliding it off the end of the shaft.

In the illustrated embodiment, two sprocket members 56, 58 are used to form sprocket wheel 44. Alternative arrangements, however, could employ a larger number of sprocket members to form each sprocket wheel. Generally, it will be desirable to minimize the number of parts and, thus, it will generally be desirable to use two sprocket members to form the sprocket wheel. However, in some circumstances it may be desirable to employ a larger number of sprocket members to form each sprocket wheel. For example, if access to the location of the installed sprocket wheel is particularly tight, it may be desirable to use a larger number of sprocket members so that each sprocket member is smaller and can be more easily positioned in or removed from its installed location. It is additionally noted that in the illustrated embodiment, the two sprocket members 56, 58 are not identical, however, if desired, it would be possible to utilize a sprocket wheel that is formed out of a plurality of identical sprocket members.

The individual sprocket members 56, 58 forming sprocket wheel 44 are held together by a bracket member 62. The sprocket members 56, 58 and the bracket member 62 are detachably secured together whereby the detachment of the bracket member 62 from the sprocket members 56, 58 allows removal of the sprocket members 56, 58 without having to longitudinally slide the sprocket members off of the shaft 42. Similarly, securement of the sprocket members 56, 58 to the bracket member 62 allows the plurality of sprocket members 56, 58 to be secured on the shaft 42 without having to longitudinally slide the sprocket members onto the shaft 42 at an end of the shaft 42 by inserting an end of the shaft into an opening in the sprocket member.

In the illustrated embodiment, sprocket members 56, 58 are secured to bracket member 62 using threaded fasteners in the form of threaded nuts 64 and threaded carriage bolts 66. Other arrangements, however, could also be employed to allow for the non-destructive attachment and non-destructive detachment of the sprocket members 56, 58 with the bracket member 62. For example, either the sprocket members or bracket member could have a threaded bore that is engaged by a bolt whereby the use of a nut could be omitted.

Typically, that part of a sprocket wheel which is subject to the most wear and is mostly likely to fail are the radially projecting teeth. The use of a bracket member 62 with sprocket members 56, 58 allows for the convenient and quick replacement of one of the sprocket members if a tooth 60 fails or becomes excessively worn. The illustrated embodiment includes a number of features that can be used individually or in combination to provide such convenience while reducing the likelihood of introducing a new point of failure. More specifically, the illustrated embodiment includes a number of features that reduce the stresses on bolts 66 to thereby limit the possibility of bolt failure.

One aspect of bracket member 62 that reduces stress applied to bolts 66 is the configuration of bracket 62 so that no torque is directly transferred from shaft 42 to bracket member 62 by a bearing engagement between bracket member 62 and shaft 42. This may be achieved by using a bracket member 62 that has a central opening 68 that is larger than shaft 42 so that the bracket member is spaced from shaft 42 in the installed position. Alternatively, bracket member 62 could have a central opening that allows for the rotational movement of bracket member 62 relative to shaft 42. For example, central opening 68 could be circular and surround a portion of shaft 42 that has a circular cross section as shown in the illustrated embodiment. Various other designs may also be employed. In this regard, it is noted that in the installed position, sprocket wheel 44 will be rotationally fixed relative to shaft 42 and, thus, it is not necessary for bracket member 62 to be able to rotate 360 degrees relative to shaft 42 when not secured to the sprocket members 56, 58 so long as bracket member 62 will not directly transfer torque to shaft 42 in its installed position. It will, however, generally be desirable for bracket member 62 to able rotate freely about shaft 42 for 360 degrees when it is not secured to sprocket members 56, 58 to avoid inadvertently securing it in a position where it is capable of directly transferring torque with shaft 42.

In the illustrated embodiment, bracket member 62 is a single bracket member that completely encircles shaft 42. Alternative designs, however, could also be employed. For example, a single bracket member that only partially encircled shaft 42 but which extended sufficiently to overlap with each abutting joint between individual sprocket members could be employed. Also, a plurality of brackets could be employed wherein a separate bracket is used to secure adjacent sprocket members at each abutting joint between individual sprocket members but which only extends through an arcuate segment sufficient to provide an appropriate and sufficiently strong point of attachment.

The use of a bracket member 62 that fully encircles shaft 42, however, does provide advantages. For example, the use of a single bracket instead of multiple brackets will reduce the overall number of parts required which generally facilitates efficient manufacture and assembly. Furthermore, by fully encircling shaft 42, bracket member 62 will remain attached to shaft 42 when sprocket members 56, 58 are removed in the field for replacement. This can reduce complications during field repair by preventing the bracket member from falling and potentially getting lost or falling into a space in the equipment that is difficult to access. It also reduces the complexity of holding the parts in place during the re-attachment of the bracket member 62 and sprocket members 56, 58 when performing field repairs.

Another feature of bracket member 62 that reduces stress on bolts 66 is that bracket member 62 includes flats 70 that engage sprocket wheel 44. In the illustrated example, bracket member 62 includes a flat 70 for each of the separate bracket members 56, 58. As can be seen in FIGS. 13-16, sprocket wheel 44 defines a cavity 72 that receives bracket member 62. In the illustrated embodiment, the cavity 72 extends across each of the sprocket members 56, 58 whereby each of the sprocket members 56, 58 define a portion of the cavity 72. Each of the sprocket members 56, 58 also include a non-circular surface in the form of a flat 74 that mates with corresponding flats 70 on bracket member 62. Although the disclosed embodiment utilizes flats, 70, 74 other, non-circular surfaces could also be employed. The use of mating surfaces 70, 74 control the orientation of sprocket members 56, 58 relative to bracket member 62.

By configuring bracket member 62 such that flats 70 bearingly engage with surfaces 74 of each of the sprocket members 56, 58, forces can be transferred between sprocket members 56, 58 through engagement of surfaces 70 with surfaces 74 instead of through bolts 66. This allows bracket member 62 to transfer internal forces within the sprocket wheel assembly between sprocket members 56, 58 while limiting the stresses placed on bolts 66.

In the illustrated embodiment, flats 70 are disposed on the outer radial surface of bracket member 62. It is also noted that, in the illustrated embodiment, central opening 68 is a circular opening that has a diameter slightly larger than the outer diameter of shaft 42 whereby bracket 62 encircles shaft 42 and is spaced from and does not directly engage the shaft 42.

In the illustrated embodiment, bracket member 62 includes four openings 76 for receiving bolts 66. Similarly, each of the sprocket members 56, 58 includes two openings 78 for receiving bolts 66. It is noted that openings 78 have a rectangular shape that mates with a rectangular portion 80 of bolts 66. This arrangement prevents bolts 66 from rotating relative to openings 78 when removing or securing nuts 64. This facilitates the easy removal and attachment of nuts 64 in a tight space.

Each of the sprocket members 56, 58 forming the exemplary sprocket wheel 44 is formed out of a flat plate of metal material that has recess 72 machined or otherwise formed therein. Similarly, teeth 60 and the other features of sprocket members 56, 58 may be machined therein.

Bracket 62 is also a flat plate and partially extends from cavity 72 which has a depth slightly less than the thickness of bracket 62. Alternative arrangements could employ a bracket that is fully seated in cavity 72. The use of a cavity 72 or similar recess is advantageous because it allows for the placement of flats 74 in the cavity 72 to engage bracket member 62 and can be efficiently manufactured. Alternative arrangements, however, could utilize a different configuration while still providing many of the same benefits. For example, protrusions from sprocket members could engage with a recess or edge of the bracket member for either relatively locating the bracket member with the sprocket members or transferring forces therebetween.

The use of a non-circular perimeter on the bracket member 62 that mates with a corresponding non-circular surface on the sprocket members 56, 58 may be used to require that the sprocket members 56, 58 are secured together in a predetermined orientation. For example, the two surfaces 70 on bracket member 62 may have different lengths with bracket members 56, 58 defining corresponding surfaces 74 that have different lengths. This would limit the possibility that two sprocket members 56 or two sprocket members 58 could be accidently secured to a single bracket member 62 instead of securing one sprocket member 56 and one sprocket member 58. By configuring bracket member 62 and sprocket members 56, 58 so that surfaces 70 bearingly engage surfaces 74, the non-circular perimeter of bracket member 62 reduces the load applied to the bolts 66 securing bracket member 62 to sprocket members 56, 58.

The use of a flat plate to form sprocket members 56, 58 and a flat plate to form bracket member 62 reduces the width of the cross sectional area of the sprocket wheel assembly in comparison to sprocket wheels having a sleeve like hub that surrounds the shaft. This reduced cross sectional area provides benefits. More specifically, the reduced cross sectional area reduces the weight of the sprocket wheel assembly thereby reducing overall weight of the shaft and reducing the power required to move the shaft. When used in the feederhouse of an agricultural combine, the reduced cross sectional area also increases the cross sectional area within the feederhouse for moving the cut crop from the reel to the threshing mechanism. This increased cross sectional area available for transfer of the cut crop has the potential to reduce grain damage during the transfer process.

Significantly, this arrangement of the sprocket wheel assembly that allows the bracket member 62 to be secured and detached from sprocket members 56, 58 greatly eases the process of removing and replacing a sprocket wheel 44 or portion thereof by allowing the sprocket members 56, 58 to be removed and replaced while shaft 42 remains in its installed position and without having to slide any of the sprocket members 56, 58 off of, or on to, one of the ends of shaft 42. This aspect of the sprocket wheel assembly reduces maintenance costs, down-time of the equipment and the number of parts that must be replaced. It is particularly helpful when employed with a shaft 42 mounted in the feederhouse of an agricultural combine.

Shaft 42 defines a circular cross section for the vast majority of its length. Where the sprocket assemblies are secured to shaft 42, the shaft 42 defines one or more flats 82 or other non-circular surfaces for engagement with sprocket wheel 44 whereby torque may be transferred between shaft 42 and sprocket wheel 44. The flats 82 on shaft 42 mate with flats 84 located on sprocket members 56, 58. Flats 82 are disposed within recess 86 on shaft 42. Recess 86 has a longitudinal width that is substantially equivalent but slightly larger than the width of sprocket members 56, 58 where sprocket members 56, 58 engage shaft 42. In this manner, sprocket members 56, 58 are seated within recesses 86. As can be seen in FIG. 22, that portion of bracket member 62 disposed within the recess 72 located on sprocket members 56, 58 is positioned above recess 86 while that portion that extends longitudinally beyond the sprocket members 56, 58 is positioned above a portion of shaft 42 that has a circular cross section. It is also noted that while the illustrated flats 82 and recess 86 do not extend for the full perimeter of shaft 42 alternative arrangements could employ recesses and flats that do extend about the full circumference of shaft 42. It is still further noted that sprocket members 56, 58 define a segment of a circle where the sprocket members 56, 58 face that portion of circumference of shaft 42 that does not include recess 86 at the longitudinal location of sprocket wheels 44.

The use of recesses 86 which receive sprocket members 56, 58 and which are provided with a width that restricts the longitudinal movement of sprocket members 56, 58 as depicted in FIG. 22 allows recesses 86 to define the installed longitudinal position of the sprocket wheels 44 on shaft 42. This facilitates the re-assembly of sprocket wheels 44 when conducting repairs in the field by controlling the longitudinal position of the installed sprocket wheels and thereby reducing the potential for center-to-center sprocket misalignment. The use of recesses 86 which are located only at the longitudinal position of the sprocket wheels also significantly reduces the machining of shaft 42 compared to a shaft having flats that extend the full longitudinal length of the shaft.

In the illustrated embodiment, there is a separate flat 82 on the shaft for engagement with a flat 84 on each sprocket member 56, 58. By providing a flat for each of the plurality of sprocket members 56, 58, each of the sprocket members 56, 58 may be engaged with shaft 42 in a manner that allows for the transfer of torque between shaft 42 and each of the separate sprocket members 56, 58. Generally, it will be advantageous for each of the sprocket members to be in bearing engagement with shaft 42 that provides for the transfer of torque between the shaft and sprocket members, however, in some embodiments, it may be possible for less than all of the sprocket members to be bearingly engaged with the shaft in a manner that transfers torque so long as there is at least one sprocket member so engaged.

Figure 24:
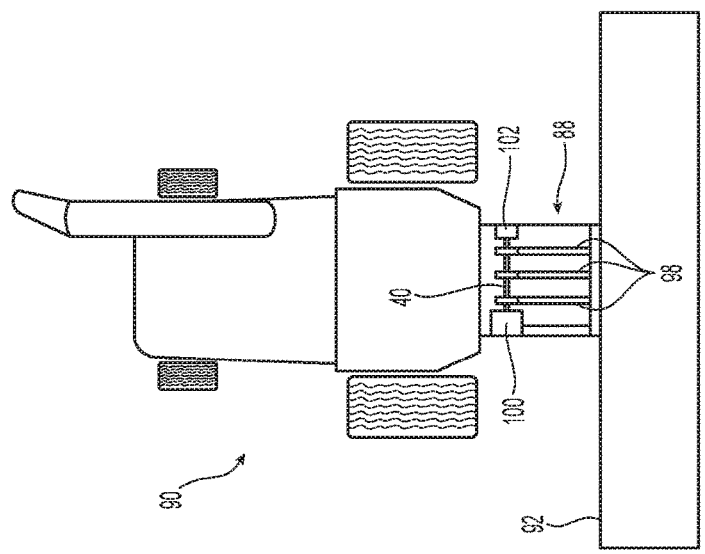
FIG. 24 is a schematic top view of a combine.
Figure 23:
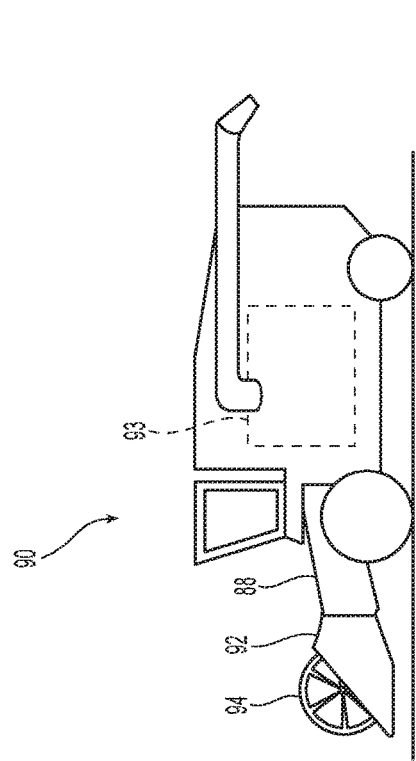
FIG. 23 is a schematic side view of an agricultural combine.
Figure 25:
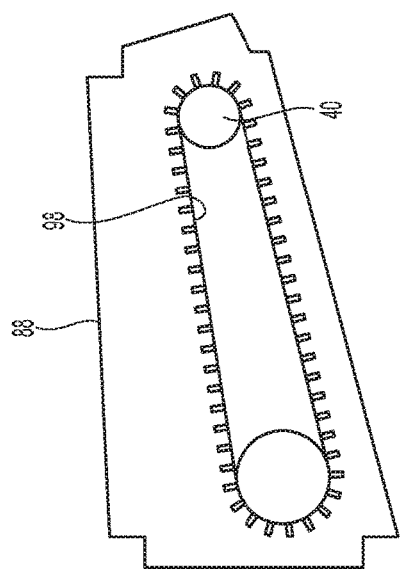
FIG. 25 is a schematic view of a feederhouse.

The shaft and sprocket assemblies disclosed herein may be used in a variety of applications. One particularly advantageous application is the feederhouse assembly of an agricultural combine. FIGS. 23-25 schematically depict the use of a shaft and sprocket assembly as described herein in the feederhouse assembly 88 of an agricultural combine 90. Combine 90 includes a removable header 92 having a reel 94 for cutting a crop. An auger then moves the cut crop towards the center of the header 92 where it enters the feederhouse 88. Feederhouse 88 then lifts and transports the cut crop to threshing mechanism 93. Sprocket and shaft assembly 96 are used to drive the lift elevator chains within feederhouse 88. Except for sprocket and shaft assembly 40, combine 90 has a conventional design and construction. It is noted that FIG. 24 is a schematic view in which the top portion of the housing surrounding the feederhouse 88 is not shown whereby the internal arrangement of the feederhouse can be better visualized.

Sprocket and shaft assembly 40 has a shaft 42 and a plurality of sprocket wheels 44 mounted thereon. Each of the sprocket wheels 44 are engaged with a lift elevator chain 98. The first end 50 of shaft 42 having splined insert 48 is engaged with a gear box 100 that is driven by the engine of combine 90 and rotatably drives shaft 42. The second end 54 of shaft 42 is formed by splined insert 52 and is rotatably supported on a bearing assembly 102 such as a bearing assembly mounted in a pillow block. Each of the sprocket members 56, 58 of each of the sprocket wheels 44 can be non-destructively removed and replaced without disengaging the first end 50 of shaft 42 with the gear box 100 or the second end 54 of shaft 42 with the bearing assembly 102. As discussed above, this facilitates the convenient removal and replacement of damaged or worn sprocket members.

While this invention has been described as having an exemplary design, the present invention may be further modified within the spirit and scope of this disclosure. This application is therefore intended to cover any variations, uses, or adaptations of the invention using its general principles.

What is claimed is:

1. A shaft and sprocket assembly comprising:
   an elongate shaft;
   a sprocket wheel encircling the shaft and engaged with the shaft wherein torque is directly transferrable between the shaft and the sprocket wheel and including a plurality of radially outwardly projecting teeth, the sprocket wheel being formed by a plurality of sprocket members, each of the sprocket members having at least one of the radially outwardly projecting teeth and defining an angular portion of the sprocket wheel less than 360 degrees;
   at least one bracket member detachably securing the plurality of sprocket members together wherein detachment of the at least one bracket member from the plurality of sprocket members detaches the plurality of sprocket members from the shaft and securement of the at least one bracket member to the plurality of sprocket members allows direct attachment of the plurality of sprocket members at a selected axial location on the shaft and wherein, when the at least one bracket member is secured to the plurality of sprocket members, the at least one bracket member is in an arrangement with the shaft wherein torque is not directly transferred from the shaft to the bracket member; and
   wherein the sprocket wheel defines a cavity for receiving at least a portion of the bracket member wherein each of the sprocket members defines a portion of the cavity and the bracket member defines at least one non-circular feature, the non-circular feature on the bracket member mating with a corresponding non-circular surface in the portion of the cavity defined by each of the sprocket members whereby mating of the non-circular feature on the bracket member with the corresponding non-circular surfaces places the plurality of sprocket members in a predetermined orientation and prevents relative rotation between the bracket member and the sprocket members.

2. The assembly of claim 1 wherein the non-circular feature of the bracket member is defined by at least one flat and engagement of the at least one flat on the bracket member with the corresponding non-circular surfaces in the cavity allow for the transfer of force between the bracket member and the plurality of sprocket members when torque is being transferred from the shaft to the sprocket wheel.

3. The assembly of claim 2 wherein the sprocket wheel and the bracket are both formed by flat plates and the bracket member is detachably secured to the plurality of sprocket members with threaded fasteners.

4. The assembly of claim 3 wherein the at least one flat is disposed on a radially outer edge of the bracket member.

5. The assembly of claim 4 wherein the plurality of sprocket members consists of two sprocket members and the bracket member further defines a circular opening through which the shaft extends.

6. A feederhouse assembly for use with an agricultural combine, the feederhouse assembly comprising:
   a lift elevator;
   a plurality of chains for driving the lift elevator; and
   a shaft and sprocket assembly comprising:
      an elongate shaft;
      a plurality of sprocket wheels with each sprocket wheel having a plurality of outwardly projecting teeth to thereby engage a respective one of the plurality of chains and transfer torque to the respective chain, each sprocket wheel encircling the shaft and engaged with the shaft wherein torque is directly transferrable between the shaft and the sprocket wheel whereby torque is transferrable from the shaft to the chain through the sprocket wheel; the sprocket wheel being formed by a plurality of sprocket members, each of the sprocket members having at least one of the outwardly projecting teeth and defining an angular portion of the sprocket wheel less than 360 degrees;

at least one bracket member engageable with each respective sprocket wheel and detachably securing the plurality of sprocket members together wherein detachment of the at least one bracket member from the plurality of sprocket members detaches the plurality of sprocket members from the shaft and securement of the at least one bracket member to the plurality of sprocket members allows direct attachment of the plurality of sprocket members at a selected axial location on the shaft and wherein, when the at least one bracket member is secured to the plurality of sprocket members, the at least one bracket member is in an arrangement with the shaft wherein torque is not directly transferred from the shaft to the bracket member; and wherein the shaft defines a non-circular surface for each respective sprocket wheel and wherein engagement of the non-circular surface by the respective sprocket wheel places the plurality of sprocket wheels in predefined relative positions; and wherein each of the sprocket wheels defines a cavity for receiving at least a portion of a respective one of the bracket members wherein, for each of the sprocket wheels and the respective bracket member, each of the sprocket members defines a portion of the cavity and the respective bracket member defines at least one non-circular feature, the non-circular feature on the respective bracket member mating with a corresponding non-circular surface in the portion of the cavity defined by each of the sprocket members whereby mating of the non-circular feature on the respective bracket member with the corresponding non-circular surfaces places the plurality of sprocket members in a predetermined orientation and prevents relative rotation between the bracket member and the sprocket members.

7. The feederhouse assembly of claim 6 wherein the shaft defines first and second opposite ends, the first end being operably engaged with a gear box whereby the gear box rotatably drives the shaft and the second end of the shaft is rotatably supported on a bearing assembly.

8. The feederhouse assembly of claim 7 wherein each of the sprocket members of each of the sprocket wheels can be removed and replaced with the first end of the shaft engaged with the gear box and the second end of the shaft engaged with the bearing assembly.

9. The feederhouse assembly of claim 8 wherein each of the sprocket wheels is a flat plate defining the plurality of radially outwardly extending teeth engageable with a respective one of the chains and the shaft defines a plurality of recesses, each of the plurality of recesses adapted to receive a respective one of the plurality of the sprocket wheels and wherein shaft defines a circular cross section with each of the plurality of recesses being formed by non-circular surface, the non-circular surface having a longitudinal width adapted to receive the respective one sprocket wheel and restrict longitudinal movement of the respective one sprocket wheel thereby defining a longitudinal location on the shaft at which the respective one sprocket wheel is secured and thereby placing the plurality of sprocket wheels in predefined relative longitudinal positions.

10. The feederhouse assembly of claim 9 wherein the non-circular surface forming each of the plurality of recesses includes a plurality of flats wherein each of the plurality of sprocket members of each of the sprocket wheels are engaged by one of the plurality of flats and the engagement of the plurality of flats with the plurality of sprocket members is a bearing engagement that directly transfers torque between the shaft and the plurality of sprocket members.

11. The feederhouse assembly of claim 6 wherein the non-circular feature of each of the respective bracket members is defined by at least one flat and engagement of the at least one flat on the respective bracket member with the corresponding non-circular surfaces in the cavity allow for the transfer of force between the respective bracket member and the plurality of sprocket members when torque is being transferred from the shaft to the sprocket wheel.

\* \* \* \* \*